United States Patent Office 3,237,150
Patented Feb. 22, 1966

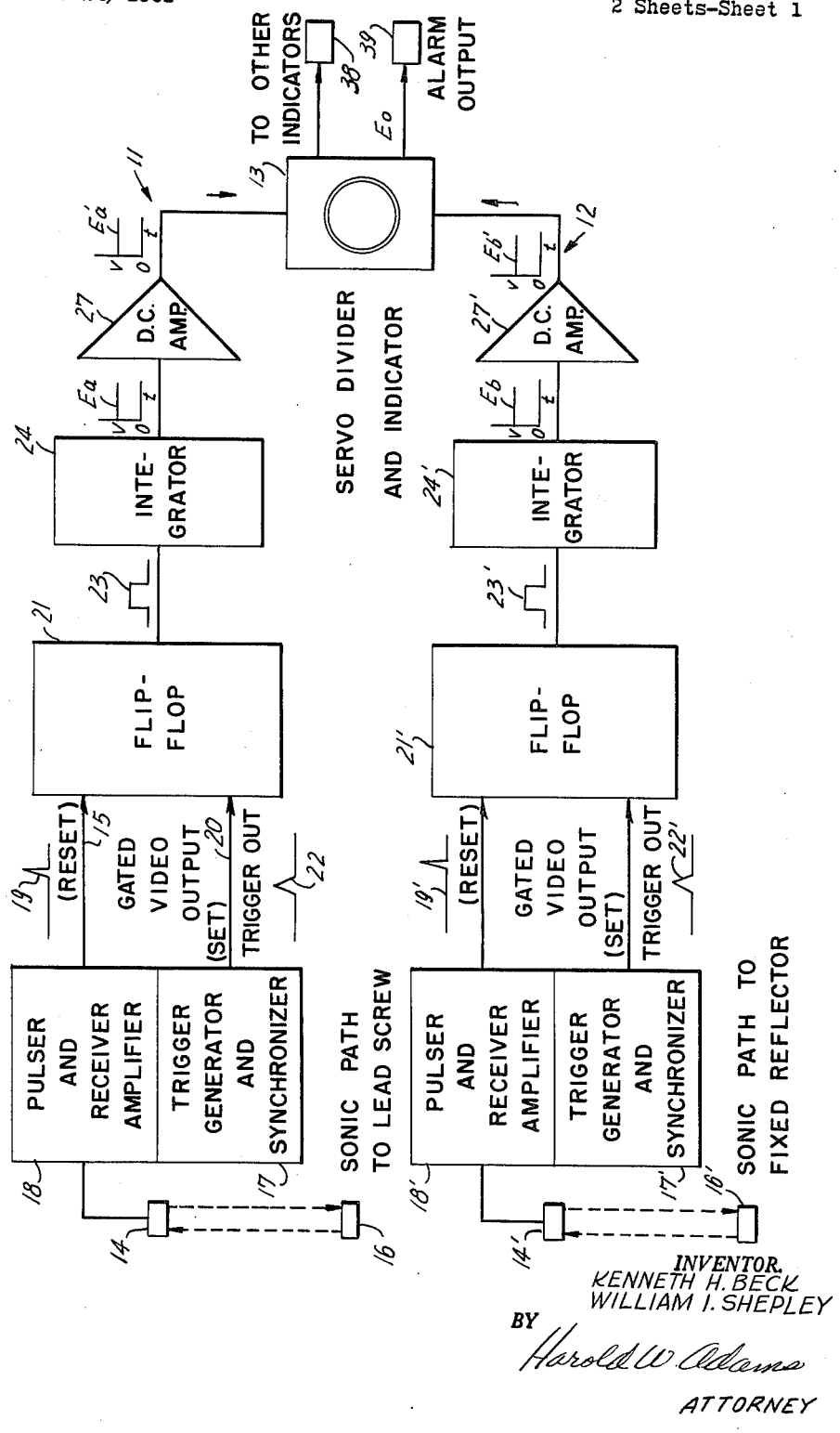

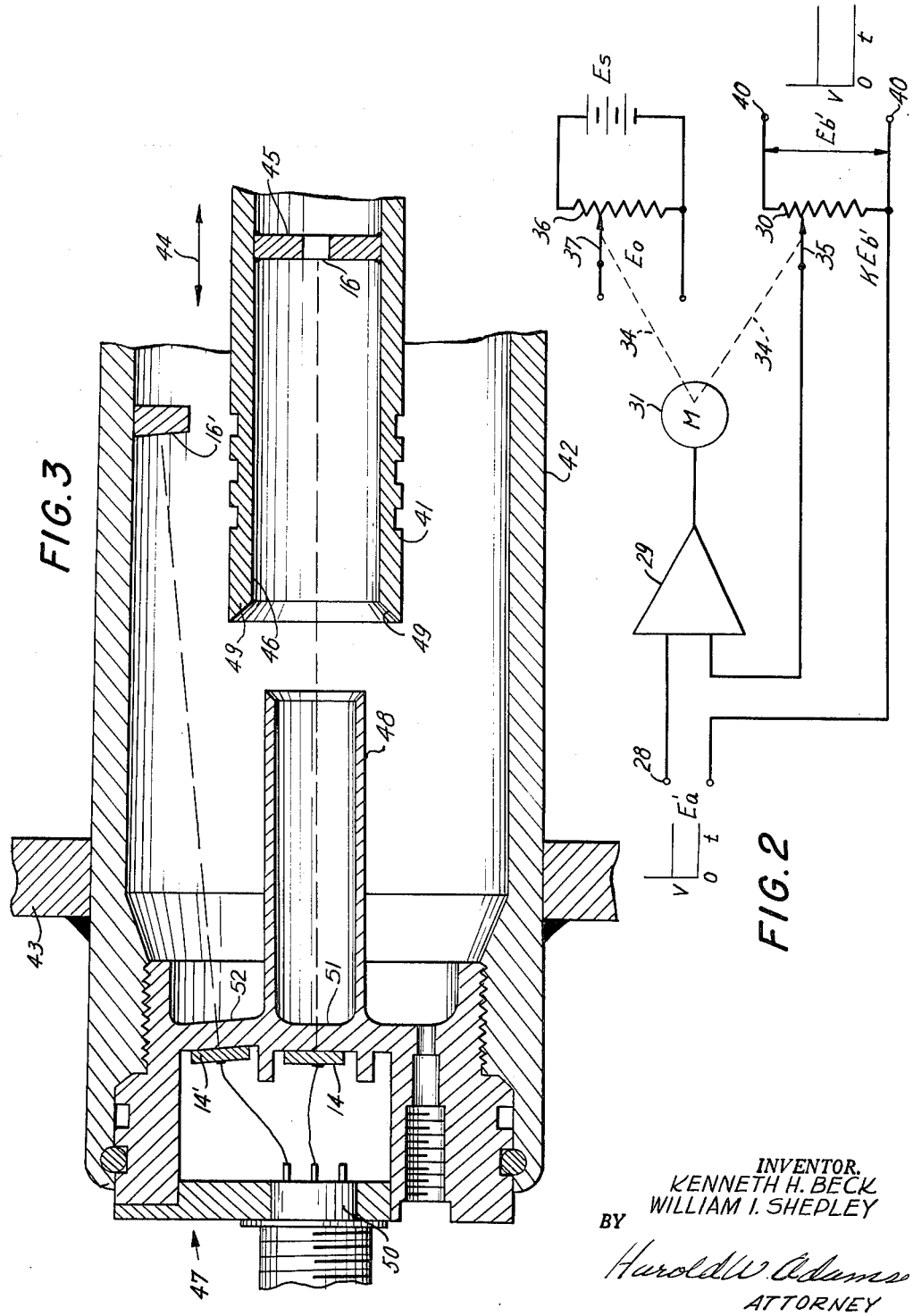

3,237,150
ULTRASONIC POSITION INDICATOR SYSTEM
Kenneth H. Beck, Newtown, Pa., and William I. Shepley, Skillman, N.J., assignors to Curtiss-Wright Corporation, a corporation of Delaware
Filed Feb. 24, 1961, Ser. No. 91,419
2 Claims. (Cl. 340—1)

This invention relates to an apparatus for indicating the position of an object utilizing ultrasonics.

It is known to measure the transit time of a pulse of ultrasonic energy in traveling between a fixed point and an unknown position to be indicated. Knowing the velocity of propagation of the ultrasonic pulse and having measured the pulse transit time, the distance of the unknown position from the fixed position is determined.

In conventional position indicator systems employing ultrasonics the velocity of propagation of the ultrasonic pulse is assumed to be constant. However, the propagation velocity is not constant as assumed. The velocity of propagation of ultrasonic as well as sonic waves depends upon the sometimes variable properties of the medium in which propagated. Thus conventional ultrasonic pulse transit time techniques are subject to great inaccuracies when the properties of the medium of propagation of the ultrasonic pulse vary.

For instance, in air the approximate velocity of an ultrasonic wave of one megacycle frequency is 331 meters per second. The same ultrasonic wave travels at a velocity of 1470 meters per second in water. In water the velocity of ultrasonic wave propagation varies with the temperature and pressure of the water.

In many applications minor variations of ultrasonic wave propagation velocity in pulse transit time measuring techniques is permissible. Although the measurements are inaccurate they are sufficiently accurate for the purposes intended.

There are many instances however when the position of an object must be determined with great accuracy. Also, it is necessary to position the object in a medium whose properties are subject to change; thus causing wide variations of ultrasonic wave velocity in the propagation medium. Thus conventional pulse transit time techniques which assume a constant ultrasonic velocity cannot be employed.

For instance in nuclear reactors, control rods are used to control the nuclear reactivity by positioning material of high neutron absorbing property in the reactor core. It is imperative that the nuclear reactivity be precisely controlled and the position of the control rods within the reactor core is critical.

It is customary to support the control rods in tubes which extend into the reactor. Coolant under high pressure and temperature is forced through the tubes around the control rods. Because of the variation of the pressure and temperature in the coolant around the control rods, the propagation velocity of an ultrasonic pulse introduced into the coolant varies. This of course makes position indication based on ultrasonic measurements which assume a constant ultrasonic wave velocity extremely unreliable and inaccurate.

Accordingly, it is an object of this invention to provide an apparatus for accurately indicating the position of an object utilizing ultrasonic energy.

Another object of this invention is to provide an apparatus utilizing ultrasonic energy for accurately indicating the position of an object in a medium having variable properties.

Although a preferred embodiment of our invention may be used to accurately indicate the position of a control rod in a nuclear reactor it may be employed where it is necessary to locate accurately an object in any medium whose properties vary over a wide range. It is pointed out that an ultrasonic position indicating system is preferable in nuclear reactors because mechanical measuring apparatus is difficult to use due to the high temperatures and pressures developed in the reactor. Other electrical and electromagnetic type position indicator systems have not proved satisfactory for the attainment of high accuracy measurements.

Apparatus according to our invention for performing these and many other objects may include an unknown measuring channel and a standard measuring channel. The unknown measuring channel determines the round-trip transit time of an ultrasonic pulse in traveling between a fixed and unknown position and produces a first signal proportional thereto. The standard measuring channel similarly determines the round trip transit time of an ultrasonic pulse in traveling between the fixed and a known position and produces a second signal proportional thereto.

Means are provided for taking the ratio of the round trip pulse transit times and for compensating said first signal in accordance with variations in the ratio of said first and second signals. Further means responsive to said comparison means are provided for generating a third signal proportional to the distance between said unknown position and said fixed position.

Many other objects and advantages of our invention will become apparent from the following description when taken in view of the accompanying drawings in which:

FIGURE 1 is a block diagram of our ultrasonic position indicator system including an unknown and a standard pulse transit time measuring channel;

FIGURE 2 is an electrical schematic of a servo divider for taking the ratio of the pulse transit time measurements of the unknown and standard measuring channels; and FIGURE 3 is a sectional view illustrating an embodiment of our invention for indicating the position of a control rod of a nuclear reactor.

Referring to FIG. 1 our invention includes an unknown measuring channel 11 and a standard measuring channel 12 interconnected by a servo divider and indicator 13. In the unknown measuring channel 11 a transducer 14 is positioned an unknown distance from an object 16, the position of which is to be indicated with respect to a fixed position. In this instance the fixed position is the position of the transducer 14 which remains stationary.

A variable frequency trigger generator and synchronizer 17 controls a pulser and receiver amplifier 18 which periodically excites the transducer 14. This causes the transducer 14 to emit a pulse of ultrasonic energy each time the trigger generator and synchronizer 17 triggers the pulser and receiver amplifier 18.

The ultrasonic pulses travel through the coupling medium between the transducer 14 and the object 16. In this instance the system is being employed to indicate the position of a control rod within a nuclear reactor (FIG. 3) and the coupling medium is the cooling water employed to maintain the reactor core at a proper temperature.

The ultrasonic pulses travel through the cooling water until they strike the object 16 where they are reflected back along the transmission path to the transducer 14. Since both the temperature and pressure of the cooling water may vary over a wide range the velocity of the ultrasonic pulses in the cooling water may also vary.

Each reflected ultrasonic pulse received by the transducer 14 is converted thereby into an electrical signal which is received by the receiver amplifier 18 and amplified and transformed into a gated video output pulse 19.

The gated video output pulse 19 is fed to a flip-flop circuit 21 by means of conductor 15. The flip-flop circuit 21 may be a conventional circuit such as an Eccles-Jordan flip-flop circuit and need not be described in detail.

The trigger generator and synchronizer 17 in addition to exciting the pulser and receiver 18 also feeds a trigger pulse 22 to the flip-flop 21 on conductor 20 each time the transducer 14 is pulsed. The flip-flop circuit 21 is arranged so that the trigger pulse 22 sets or turns on the flip-flop circuit while the gated video pulse 19 resets the flip-flop circuit 21.

An output pulse 23 of the flip-flop 21 is rectangular in waveform and of a constant amplitude. The pulse 23 is repeated at the pulse repetition frequency of the trigger generator and synchronizer 17. Thus, each time the trigger generator and synchronizer 17 pulses the transducer 14 the trigger output pulse 22 sets the flip-flop 21, thereby starting the rectangular output signal 23.

The output signal 23 continues until the ultrasonic pulse transmitted from the transducer 14 into the cooling water strikes the reflective surface 16 and is reflected back to the transducer 14. At that time the reflected ultrasonic waves are converted to an electrical signal which is amplified and transformed into the gated video output pulse 19 which turns off the flip-flop 21. This cuts off the output pulse 23.

The time between the trigger pulse 22 and the gated video pulse 19 is the round trip pulse transit time of the ultrasonic pulses in traveling between the transducer 14 and object 16. The round trip pulse transit time is a function of the distance between the transducer 14 and the object 16. Since the output 23 of the flip-flop 21 is rectangular and the duration of each pulse 23 corresponds to the round trip transit time of the sonic wavetrain in the cooling water, the area under each pulse 23 is proportional to the round trip pulse transit time.

The voltage pulse 23 is connected to and integrated by an integrator 24. The integrator 24 transforms the voltage pulse 23 into a D.C. signal $Ea$. The amplitude of the D.C. signal $Ea$ is proportional to the roundtrip pulse transit time and therefore the distance between the transducer 14 and the object 16. The D.C. signal $Ea$ is further amplified to a voltage level $Ea'$ by a D.C. amplifier 27 and fed to the servo divider and indicator 13.

The unknown measuring channel 11 and standard measuring channel 12 are identical in components and in operation. The elements and pulse waveforms of the standard measuring channel 12 are designated with the corresponding number of like elements in the unknown measuring channel 11 except the numerals in the standard measuring channel 12 are prime numerals. For example, the transducer 14 of the unknown measuring channel is designated 14′ in the standard measuring channel and similarly for all numerals. Also the amplified output voltage of the D.C. amplifier 27′ is designated $Eb'$.

As stated the output voltage $Ea'$ of the D.C. amplifier 27 is a function of the roundtrip pulse transit time required for an ultrasonic pulse to travel from the transducer 14 to the reflective surface 16 and back again. Assuming the velocity of the ultrasonic pulse in the cooling water remains constant the output signal $Ea'$ may be directly converted to feet, inches or other dimension by using a direct reading indicator instrument. The velocity of an ultrasonic wave is determined by the properties of the propagation medium in which it travels. Variation in temperature and pressure causes the propagation velocity of the ultrasonic wave to vary, thus producing erroneous distance measurements in any instrument designed on the assumption of constant velocity. In order to indicate positions accurately, variations in the ultrasonic wave propagation velocity must be accounted for.

We have discovered that by using the standard measuring channel 12 in conjunction with the unknown measuring channel 11 and taking the ratio of their respective outputs $Ea'/Eb'$, variation of the ultrasonic wave velocity in the cooling medium caused by temperature and pressure variation can be compensated for. The distance between the object 16 and the transducer 14 is accurately indicated by the ratio $Ea'/Eb'$. This may be shown as follows:

Referring to FIG. 1 the velocity $V_1$ pulse transmitted from the transducer 14 is expressed as follows:

$$(1) \quad V_1 = \frac{D_1}{T_1}$$

where $D_1$ is twice the unknown distance between the transducer 14 and the object 16 while $T_1$ is the round trip pulse transit time.

The velocity $V_2$ of the ultrasonic pulse transmitted by the transducer 14′ in the standard measuring channel 12 is expressed as follows:

$$(2) \quad V_2 = \frac{D_2}{T_2}$$

where $D_2$ is twice the known distance between the fixed object 16′ and the transducer 14′ and $T_2$ is the round trip pulse transit time.

The velocities $V_1$ and $V_2$ (Equations 1 and 2) may vary but are substantially equal at any instance. Even though both the temperature and pressure of the cooling water vary rapidly they vary substantially uniformly throughout the cooling water. Thus $$(3) \quad V_1 = V_2$$

and $$(4) \quad \frac{D_1}{T_1} = \frac{D_2}{T_2}$$

$D_2$ is a constant and (4) may be written as:

$$(5) \quad D_1 = D_2 T_1 / T_2$$

As $Ea'$ is proportional to $T_1$ and $Eb'$ proportional to $T_2$, (6) becomes (7) $D_1 = CEa'/Eb'$ where $C$ is a proportionality constant.

Thus it is shown that even though the velocity of propagation of the ultrasonic pulses in the cooling water varies, the position of the object 16 or its distance from the transducer 14 is accurately determined by the ratio of the two voltages $Ea'/Eb'$. Since both voltages $Ea'$ and $Eb'$ are subject to the same variations in ultrasonic pulse velocity, the distance measurement $D_1$ is unaffected by this variation in the ultrasonic velocity.

Referring now to FIG. 2 a servo divider system for taking the ratio of the voltages $Ea'$ and $Eb'$ is shown. The voltage $Ea'$ is connected to the input 28 of a servo amplifier 29 while the voltage $Eb'$ is connected across contacts 40 of a motor driven feedback potentiometer 30 driven by a servo motor 31. The servo motor 31, energized by the output of the servo amplifier 29, rotates a shaft 34 moving the wiper 35 across the potentiometer 30. Thus a voltage $kEb'$ is taken off the potentiometer 30 where $k$ is a function of the amount of rotation of the shaft 34.

The voltage $kEb'$ is fed into the servo amplifier 29 in a bucking relationship with the voltage $Ea'$. The servo amplifier 29 has a very high gain and drives the servo motor 31 adjusting the potentiometer 30 until the voltage $(Ea' - kEb')$ across the input terminal 28 is essentially zero. Since $$(8) \quad Ea' = kEb'$$

$$(9) \quad k = Ea'/Eb'$$

or $$(10) \quad k = \frac{D_1}{C}$$

thus yielding as a shaft position a value proportional to the distance between the transducer 14 and the object 16.

The ratio $Ea'/Eb'$ or shaft rotation factor $k$ is transformed into a usable voltage as follows. A potentiometer 36 energized by a fixed voltage source $Es$ is also driven by the shaft 34 of the servo motor 32. As the shaft 34 rotates it moves the wiper 37 of the potiometer 36 producing an output voltage $Eo$ proportional to the amount of shaft rotation $k$ and therefore to the ratio of $Ea'/Eb'$. Thus

(11) $$Eo = kEs = Es(Ea'/Eb') = \frac{D_1}{C}$$

Referring to FIG. 1 the voltage $Eo$ is directly read out by the servo divider and indicator 13. The voltage $Eo$ is also used to control auxiliary indicators 38 as well as an alarm circuit 39.

Thus the servo divider and indicator 13 produces not only a voltage $Eo$ proportional to the ratio $Ea'/Eb'$ but also acts as a large scale direct reading indicator from which the unknown distance $D_1$ between the transducer 14 and the reflector surface 16 can be directly read.

The servo divider ratio system provides an output voltage $Eo$ which may be utilized to control suitable alarm circuits 39. Because $Eo$ is a function of the ratio of the voltages $Ea'/Eb'$, any failure in $Ea'$ or $Eb'$, and thus failure in the unknown or standard measuring channels, produces a malfunction signal which is easily detected. This is because the voltage $Eo$ goes either to zero or its maximum value representing the practical limit to representation of an infinite ratio if $Ea$ or $Eb$ goes to zero. This provides either a full scale indication or a zero indication on the servo divider and indicator 13, either of which is easily detected. Thus this system is a fail-safe system.

Referring now to FIG. 3 an arrangement embodying the principles of our invention for indicating the position of a control rod in a nuclear reactor is shown. In this instance it is desired to position a control rod 41 in a guide tube 42 which extends into a reactor 43 that is only partially shown for purposes of clarity. The guide tube 42 is filled with a liquid coolant such as water which varies widely in temperature and pressure.

The control rod 41 is driven within the guide tube 42 by means of a lead screw (not shown) in the direction of the arrow 44. The object 16 is a reflector mounted in a bore 46 in the end of the control rod 41. The object is supported transverse to the longitudinal axis of the control rod 41 on a cross-member 45.

The transducers 14 and 14' are fixedly mounted on a detachable plug assembly 47 threadably received in the end of the guide tube 42. The transducer 14 is secured to a relatively thin walled section 51 of the plug assembly 47 and arranged to transmit ultrasonic pulses along a path perpendicular to the reflective surface of the object 16.

The transducer 14' is similarly secured to a relatively thin walled section 52 of the plug assembly 47. The transducer 14' is arranged to transmit ultrasonic pulses into the guide tube 42 along a line perpendicular to the reflective surface of the object 16' secured to the interior of the guide tube 42 at a fixed, standard distance from the transducer 14'. The object 16' is preferably mounted at about the midpoint of the stroke distance of the control rod 41 but may also be mounted at any convenient position in the tube 42 to reflect the ultrasonic waves back to the transducer 14'.

The transducers 14 and 14' are preferably formed of quartz as quartz has been found to be more suitable for operation in environments of appreciable radioactive flux. Each transducer is dimensioned relative to the wall thickness of its respective thin walled section (51 or 52), and is mounted on and coupled to the exterior surface of such section, so that transducer and its thin walled section resonate at the desired frequency. This produces a virtual transducer face at the inside surface of each of the sections 51 and 52.

This feature is very important. Because of the extremely high temperature and pressure of the water in the guide tube 42, transducers cannot be mounted and operated inside the guide tube 42. The transducers must be exteriorly mounted and they must be designed and mounted so that the inner face of the pressure vessel becomes a virtual transducer face.

A collimator tube 48 is mounted on the inside surface of the plug assembly 47 and surrounds the area opposite the transducer 14. The collimator tube 48 directs the ultrasonic pulses transmitted by the transducer 14 toward the object 16. The collimator tube 48 also shields the transducer 14 from ultrasonic waves reflected from other objects in the assembly. It is to be noted that ends 49 of the control rod 41 are beveled to prevent the ends from reflecting ultrasonic waves back to the transmitter 14.

Suitable electrical connections to the transducers 14 and 14' are brought out to the pulser and receiver amplifiers 18 and 18' respectively through a suitable plug type connector 50.

*Operation*

Referring now to FIGS. 1, 2 and 3 the operation of our invention will be described. Assume it is desired to indicate the position of the object 16 as shown in FIG. 3. The transducer 14 is pulsed and the unknown measuring channel 11 (FIG. 1) measures the round trip pulse transit time of the ultrasonic pulse in traveling between the transducer 14 and the object 16 and produces a voltage $Ea'$ proportional thereto.

In a similar fashion the standard measuring channel 12 pulses the transducer 14' and measures the round trip pulse transit time between the transducer 14' and the standard reflective surface 16', producing a voltage $Eb'$ proportional thereto.

The voltages $Ea'$ and $Eb'$ are fed to the servo divider and indicator 13 which takes the ratio of the voltages $Ea'$ and $Eb'$ and converts this ratio $Ea'/Eb'$ into a voltage $Eo$ as well as providing a scale indication of the distance indication of the distance between the transducer 14 and the object 16, or the position of the control rod 41.

In addition the voltage $Eo$ is employed to actuate other indicators 38 and an alarm 39. The voltage $Eo$ is a good malfunction signal since it goes to zero or its maximum value representing the practical limit to representation of an infinite ratio if either voltage $Ea'$ or $Eb'$ approaches zero. This happens when the unknown or standard measuring channels do not operate properly.

Although we have described our invention in detail it will be appreciated that many changes and modifications may be made by those skilled in the art without departing from the spirit of our invention. For instance, electronic ratio taking may be used rather than the servo divider. Therefore it is intended that our invention be limited only by the scope of the appended claims.

We claim:

1. A system for computing the unknown position of a first object located in an ultrasonic wave transmissive medium having a characteristic ultrasonic wave propagation velocity apt to vary, said medium containing a second object located at a known position, said system comprising transducer means for transmitting and receiving ultrasonic wave signals, being located at a boundary of said medium and transmitting signals via said medium to both objects and receiving echo signals from both objects; pulse generating means producing two sets of pulse type signals, a signal of the first set bracketing the round trip transit time of an ultrasonic signal between the transducer means and said first object, and a signal of the other set bracketing the round trip transit time of an ultrasonic signal between the transducer means and said second object; two integrators for respectively integrating said two pulse type signal sets to produce a first and a second integrated voltage having amplitudes respectively proportional to the first and second transit times; a shaft position servo-divider system including an amplifier, a servo motor responsive to said amplifier, and a potentiometer having a slider driven by said servo motor, means for applying said first integrated voltage to the input of said amplifier, means for energizing said potentiometer with said second integrated voltage, and means for applying the voltage at said slider to the input of said amplifier in balancing relation to said first integrated voltage, the motor responding to the resultant amplifier output signal to place said slider in a position representing the location of the first object independently of variations in said wave propagation velocity.

2. Apparatus for computing the unknown position of a movable nuclear control rod mounted in a tube extending into a nuclear reactor, said apparatus comprising
   (a) a first reflector secured to said movable control rod,
   (b) a second reflector supported inside said tube,
   (c) a plug assembly for closing said tube, said plug assembly including a thin wall constituting a closing transverse end wall for said tube,
   (d) a first and a second ultrasonic transducer mounted on the exterior surface of said thin wall,
   (e) electrical means for vibrating each transducer at a frequency at which such transducer resonates with said thin wall so as to constitute the interior surface of said wall virtual first and second transducer faces related respectively to the like-numbered transducers,
   (f) each transducer receiving an electrical signal from said electrical means, converting such signal to an ultrasonic signal through said thin wall to its related reflector, receiving the resultant reflected ultrasonic signal passing through said thin wall, and reconverting such reflected signal into an electrical signal,
   (g) time measurement means coupled to said transducers for generating a first and a second electrical signal which are respectively proportional to the round trip transit times between the first virtual transducer face and said first reflector, and between said second virtual transducer face and said second reflector,
   (h) and means for computing the ratio of said first and second electrical signals and generating a third electrical signal corresponding to the distance between said first reflector and said first virtual transducer face of said plug assembly, said third electrical signal being independent of variation in velocity of propagation of said ultrasonic signal in traveling from and to said first virtual transducer face.

References Cited by the Examiner

UNITED STATES PATENTS

| | | | |
|---|---|---|---|
| 2,398,816 | 4/1946 | Turner | 181—0.5 |
| 2,427,348 | 9/1947 | Bond et al. | 340—10 |
| 2,431,234 | 11/1947 | Rassweiler et al. | 73—67 |
| 2,752,542 | 7/1956 | Rod et al. | 340—3 |
| 2,841,775 | 7/1958 | Saunders | 340—3 |
| 2,856,021 | 10/1958 | Fryklund | 181—0.5 |
| 2,949,772 | 8/1960 | Kritz | 73—194 |
| 3,100,885 | 8/1963 | Welkowitz et al. | 340—3 |

FOREIGN PATENTS

| | | |
|---|---|---|
| 829,741 | 3/1960 | Great Britain. |

OTHER REFERENCES

Sonics, by T. F. Hueter et al., John Wiley and Sons Inc., New York, 1955 (pages 137, 138 relied on).

CHESTER L. JUSTUS, *Primary Examiner.*